(12) United States Patent
Lee

(10) Patent No.: US 8,778,527 B2
(45) Date of Patent: Jul. 15, 2014

(54) BATTERY CASING ASSEMBLY FOR VEHICLE

(75) Inventor: Young Kug Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 1395 days.

(21) Appl. No.: 12/080,363

(22) Filed: Apr. 1, 2008

(65) Prior Publication Data

US 2009/0061296 A1 Mar. 5, 2009

(30) Foreign Application Priority Data

Sep. 4, 2007 (KR) .......................... 10-2007-0089338

(51) Int. Cl.
- *H01M 2/02* (2006.01)
- *H01M 2/04* (2006.01)
- *H01M 2/10* (2006.01)

(52) U.S. Cl.
USPC ............................. 429/177; 429/176; 429/178

(58) Field of Classification Search
USPC .......................................... 429/100, 176–178
See application file for complete search history.

(56) References Cited

U.S. PATENT DOCUMENTS

| 3,821,996 A | * | 7/1974 | Hollins ........................ 180/68.5 |
| 4,535,863 A | * | 8/1985 | Becker ......................... 180/68.5 |
| 5,212,025 A | * | 5/1993 | Shibata et al. ................ 429/120 |
| 5,626,982 A | * | 5/1997 | Kawai et al. .................. 429/120 |

FOREIGN PATENT DOCUMENTS

| JP | 11339745 A | * | 12/1999 |
| JP | 2004-040879 A |   | 2/2004 |

OTHER PUBLICATIONS

Fukushima, T., Machine translation of JP 11339745 A, Dec. 1999.*
Office Action issued Sep. 3, 2010 in corresponding Korean application.

* cited by examiner

*Primary Examiner* — Sean P Cullen
(74) *Attorney, Agent, or Firm* — Edwards Wildman Palmer LLP; Peter F. Corless

(57) ABSTRACT

A battery casing assembly for a vehicle includes a battery housing accommodating a battery therein; at least one cover having a size corresponding to a side surface of the battery housing so as to cover the side surface; and at least one guide formed along one or more edges of the battery housing to allow the cover to be fitted therein. With the structure, the battery casing assembly can prevent the heat emitted from the engine of the vehicle being transferred to the battery.

7 Claims, 6 Drawing Sheets

BATTERY CASING ASSEMBLY FOR VEHICLE

CROSS-REFERENCE TO RELATED APPLICATIONS

This application claims priority to Korean Application No. 10-2007-0089338, filed on Sep. 4, 2007, the disclosure of which is incorporated herein by reference.

BACKGROUND

1. Technical Field

The present invention relates to a battery casing assembly for a vehicle and, more particularly, to a battery casing assembly for a vehicle in which at least one cover is installed on at least one surface of a housing accommodating the battery for preventing the heat emitted from the engine of the vehicle being transferred to the battery.

2. Background Art

A battery for a vehicle is disposed adjacent to the engine of the vehicle and is exposed to the heat emitted from the engine. A rise in the temperature of the battery, in particular, of the electrolyte therein, shortens the lifetime of the battery.

FIG. 1 illustrates a prior art battery casing assembly for suppressing a rise in the temperature of a battery.

Referring to FIG. 1, a box-shaped cover 3 is fitted on a battery housing 1 to prevent heat transfer from an engine to a battery. In this regard, while the cover 3 is effective in preventing heat transfer from the engine to the battery, it also prevents heat dissipation from the battery to the outside and slows the decrease in the temperature of the electrolyte of the battery. Therefore, a battery casing for preventing heat transfer to the battery and permitting heat dissipation from the battery to the outside is needed. The unexplained drawing reference numeral 2 designates a power terminal.

FIG. 2 illustrates a battery installed adjacent to an engine. Referring to FIG. 2, the heat from the engine is mainly concentrated in the front portion (the region A) and the side portion (the region B) of the battery. This is because the heat of the engine is directly transferred to the front portion of the battery, and air having a high temperature is blown to the side portion of the battery from a cooling fan which is installed at one side of the engine. No prior art battery casing assemblies have been designed to address this problem of local concentration of heat.

The information disclosed in this Background section is only for enhancement of understanding of the background of the invention and should not be taken as an acknowledgement or any form of suggestion that this information forms the prior art that is already known to a person skilled in the art.

SUMMARY OF THE DISCLOSURE

Accordingly, the present invention has been made keeping in mind the above problem occurring in the prior art, and an object of the present invention is to provide a battery casing assembly for a vehicle in which at least one cover is selectively installed at one or more positions at which the heat from an engine is concentrated, so that heat transfer from the engine to a battery is prevented and heat dissipation from the battery to the outside is permitted.

Another object of the present invention is to provide a battery casing assembly for a vehicle which can be fabricated at a reasonable cost.

In order to achieve the above objects, according to one aspect of the present invention, there is provided a battery casing assembly for a vehicle, comprising: a battery housing accommodating a battery therein; at least one cover having a size corresponding to a side surface of the battery housing so as to cover the side surface; and at least one guide formed along one or more edges of the battery housing to allow the cover to be fitted therein.

In a preferred embodiment, the guide is formed on at least two adjoining side surfaces of the battery housing.

In another preferred embodiment, the guide is formed on left, right and lower edges of a side surface of the battery housing such that the cover can be fitted into the guide in a vertical direction.

In still another preferred embodiment, the guide is formed on upper and lower edges of a side surface of the battery housing such that the cover can be fitted into the guide in a horizontal direction.

In still another preferred embodiment, the cover is spaced from a side surface of the battery housing by a predetermined distance. Preferably, the cover may have frame elements coupled to edges thereof and the frame elements are fitted into the guide so that the cover fitted into the guide does not fluctuate. Also preferably, the frame element may be made of sponge.

In a further preferred embodiment, the guide is injection-molded together with the battery housing.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

Other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
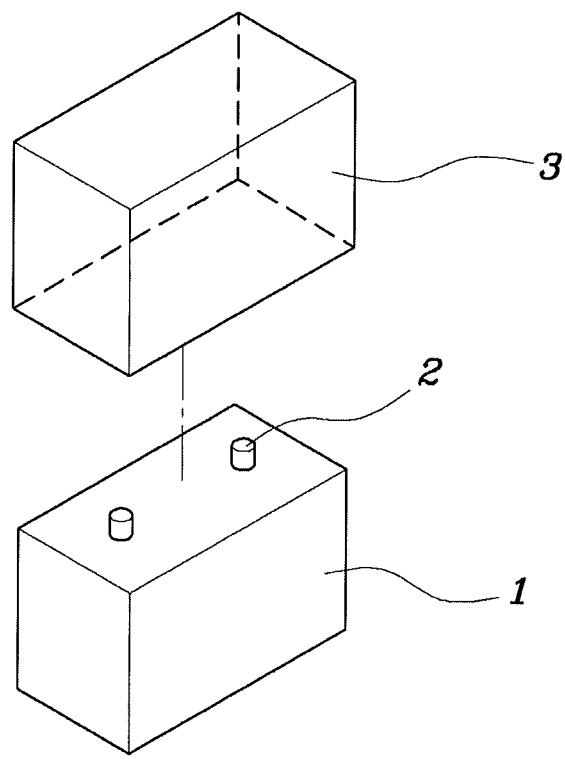
FIG. 1 is a view illustrating a conventional battery casing assembly.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to preferred embodiments of the present invention, which are illustrated in the accompanying drawings and described below. While the invention will be described in conjunction with exemplary embodiments, it should be understood that the description is not intended to limit the invention to the exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
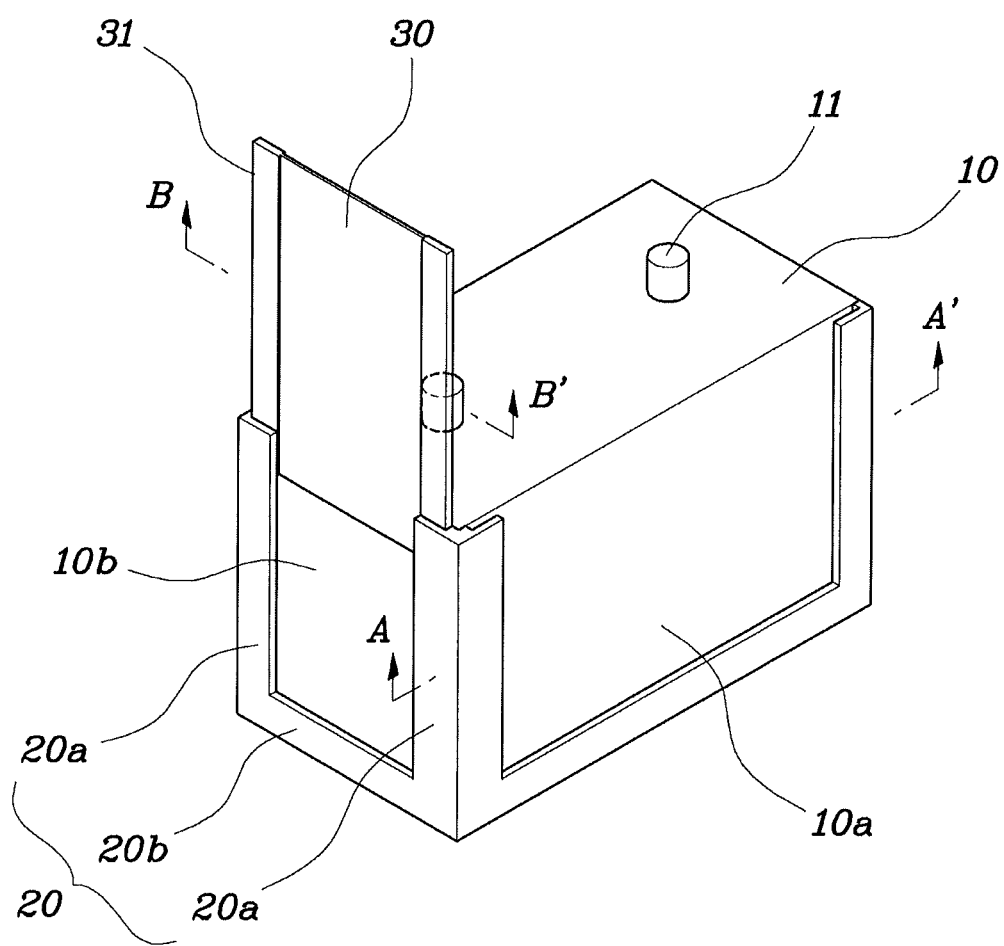
FIG. 3 is a view illustrating a battery casing assembly for a vehicle in accordance with a first embodiment of the present invention.

A battery casing assembly for a vehicle in accordance with a first embodiment of the present invention will be described below with reference to FIG. 3.

The battery casing assembly includes a battery housing 10. The battery housing 10 may have the shape of a hexahedron such as rectangular hexahedron. An electrolyte and other parts constituting a battery are accommodated in the battery housing 10.

Figure 2:
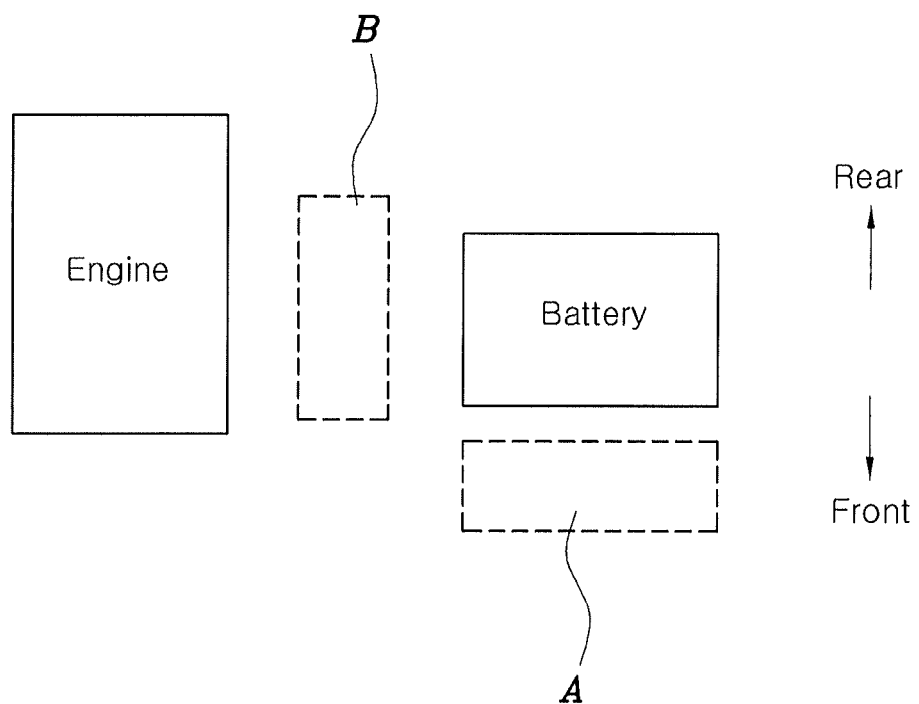
FIG. 2 is a view explaining local heat concentration on a battery due to the positional relationship between an engine and the battery.

At least one guide 20 is formed on one or more edges of the battery housing 10 and at least one cover 30 is fitted into the guide 20 in a vertical direction. Preferably, the guide 20 may be provided on two adjoining side surfaces 10a and 10b of the battery housing 10 which correspond to the front portion (the region A in FIG. 2) and the side portion (the region B in FIG. 2) of the battery, respectively, to which the heat from an engine is concentratedly transferred. Also preferably, the guide 20 may be provided on all four side surfaces of the battery housing 10.

For instance, the guide 20 is formed on the left, right and lower edges of a side surface of the battery housing 10. Left and right guide portions 20a function to guide the cover 30 and a lower guide portion 20b functions to prevent the cover 30 from being released from the guide 20. The guide 20 is injection-molded together with the battery housing 10. If the battery housing 10 is made of a particular material such as plastic, the guide 20 may, preferably, be made of the same material.

Each cover 30 has the shape of a quadrangular plate, which has a size corresponding to that of a side surface of the battery housing 10, with which the cover is associated. If the battery housing 10 has the shape of a rectangular hexahedron, the covers 30 having two different sizes may be employed.

The unexplained reference numeral 11 designates a power terminal.

Figure 4:
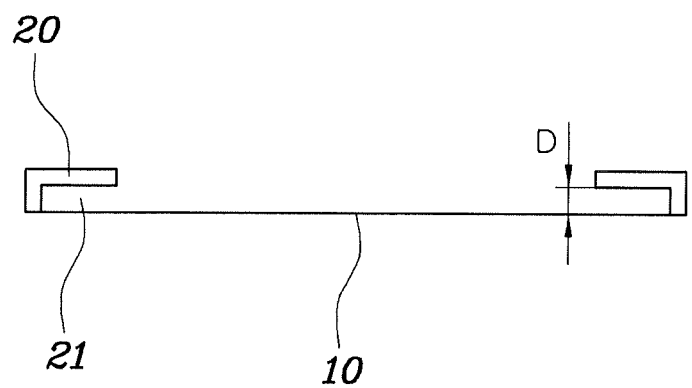
FIG. 4 is a cross-sectional view taken along the line A-A' of FIG. 3, illustrating a guide.
Figure 5:
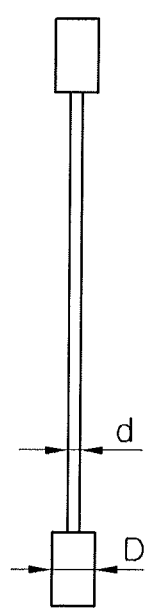
FIG. 5 is a cross-sectional view taken along the line B-B' of FIG. 3, illustrating a cover.

The detailed structures of the guide 20 and the cover 30 will be described below with reference to FIGS. 4 and 5 and the aforementioned drawings.

Each guide portion of the guide 20 can have the sectional shape of an "L" rotated 90° clockwise or counterclockwise. A frame element 31 is coupled to each edge of the cover 30, which is fitted into the space 21 defined inside each guide portion of the guide 20. The thickness of the space 21 of the guide 20 substantially corresponds to the thickness D of the frame element 31 (FIG. 5). This functions to prevent the frame element 31, fitted into the space 21 of the guide 20, from fluctuating and generating vibration and noise. It is preferred that the frame element 31 be made of sponge.

Due to the presence of the frame element 31 which has the thickness D, greater than the thickness d of the cover 30 (FIG. 5), the cover 30 can be spaced from the battery housing 10 by a predetermined distance, creating an air layer between the cover 30 and the battery housing 10. The air layer prevents the heat of the cover 30 from being directly transferred to the battery housing 10, thereby preventing the temperature of the battery from increasing.

A battery casing assembly for a vehicle in accordance with a second embodiment of the present invention will be described below with reference to FIG. 6.

Figure 6:
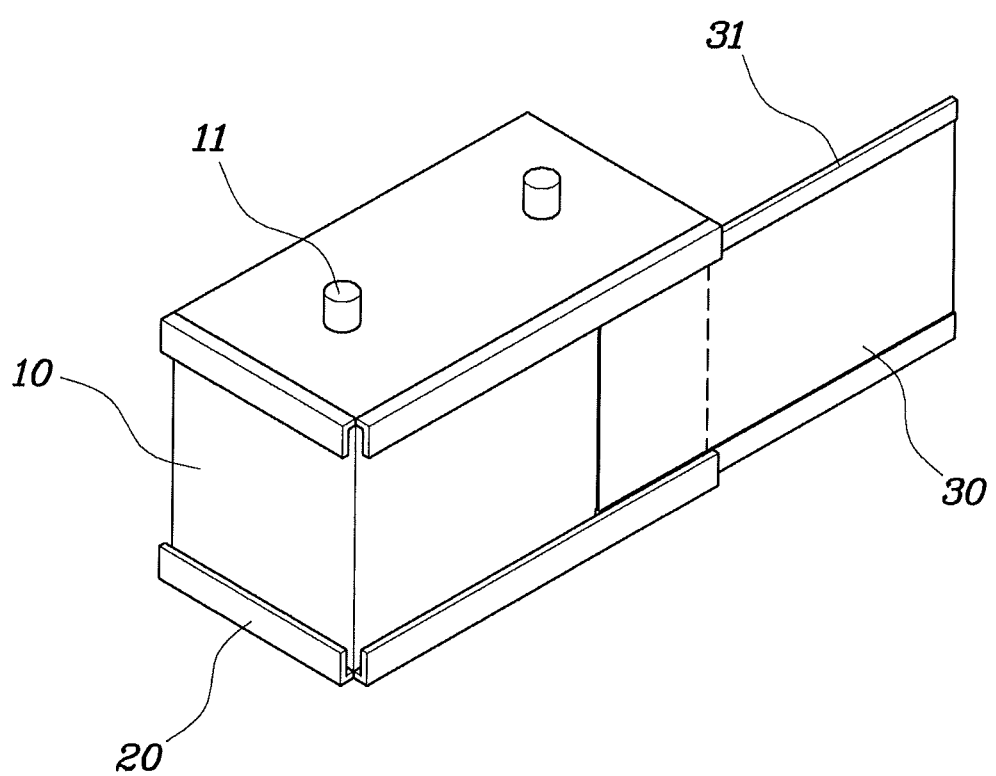
FIG. 6 is a view illustrating a battery casing assembly for a vehicle in accordance with a second embodiment of the present invention.

Referring to FIG. 6, the cover 30 can be fitted into the battery housing 10 in a horizontal direction. In this case, each guide 20 is formed along the upper and lower edges of a side surface of the battery housing 10. As in the first embodiment, frame elements 31 can be formed on edges of the cover 30.

Figure 7:
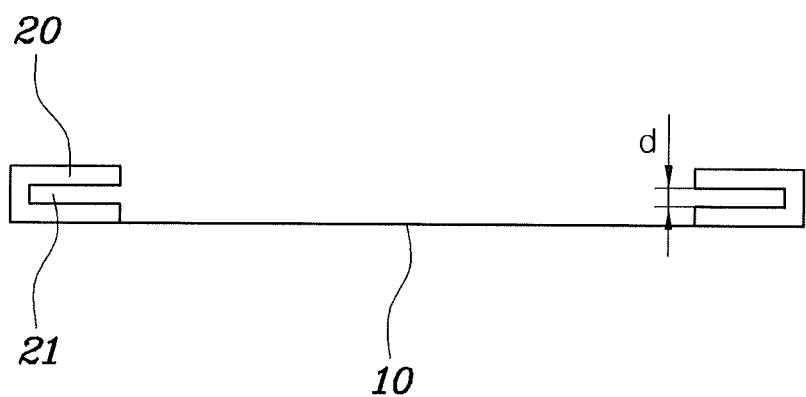
FIG. 7 is a cross-sectional view similar to FIG. 5, illustrating another guide.
Figure 8:
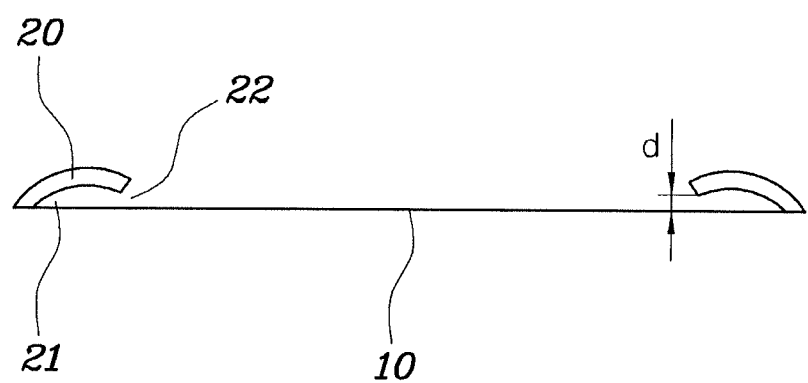
FIG. 8 is a cross-sectional view similar to FIG. 5, illustrating still another guide.

FIGS. 7 and 8 illustrate other structures of the guide which can be adopted in the present invention.

Referring to FIG. 7, when viewed in the direction perpendicular to the length of the guide 20, each guide portion of the guide 20 can have the sectional shape of a "U" rotated 90° clockwise or counterclockwise. The thickness of the space 21 of each guide portion of the guide 20 substantially corresponds to the thickness d of the cover 30 (as shown in FIG. 5).

In this case, a frame element does not need to be formed on the edge of the cover 30. This is because the cover 30 can be securely held in the space 21 of the guide 20 in a state in which it is spaced from the battery housing 10 owing to the U-shaped guide portion of the guide 20.

Referring to FIG. 8, when viewed in the direction perpendicular to the length of the guide 20, each guide portion of the guide 20 can have the sectional shape of an arc. For example, it may be approximately ⅓ of a complete circle. The size d of the entrance 22 of each guide portion of the guide 20 substantially corresponds to the thickness d of the cover 30 (as shown in FIG. 5). The space 21 defined in each guide portion of the guide 20 has a size greater than that of the entrance 22 to thus be able to accommodate the frame element 31 of the cover 30 therein. In this case, it is necessary that the sectional shape of the frame element 31 of the cover 30 correspond to that of the space 21 defined in each guide portion of the guide 20.

As is apparent from the above description, the battery casing assembly for a vehicle according to the present invention, constructed as mentioned above, provides advantages in that, since covers can be selectively installed at positions at which the heat from an engine is concentrated, heat transfer from the engine to a battery is prevented, and heat dissipation from the battery to the outside is permitted.

Also, because the battery can be placed on the market with the covers mounted to a battery housing, the work of assembling the battery casing assembly on a vehicle assembly line is not needed.

Further, the guides are injection-molded together with the battery housing and the covers are not installed on all surfaces of the battery housing, thereby improving economical aspects of commercial product.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:
1. A battery casing assembly for a vehicle, comprising:
a battery housing accommodating a battery therein;

a plurality of covers, each cover having a size corresponding to one side surface of a plurality of side surfaces of the battery housing so as to cover the one side surface;

a plurality of guides, each guide of the plurality of guides formed along different edges of each of the plurality of side surfaces of the battery housing respectively; and frame elements formed along at least two sides of each cover, the frame elements having a thickness greater than a thickness of the cover, to create, when received within at least one guide of the plurality of guides, an air layer is formed between each cover and the battery housing, wherein the frame elements are coupled to at least two edges of at least one cover of the plurality of covers respectively and the frame elements are fitted into at least two guides of the plurality of guides respectively so that the cover fitted into the respective at least two guides does not fluctuate, wherein each guide receives one of the frame elements to be fitted therein, wherein the frame elements are slid into and out of one of the guides along with the at least one cover coupled to the frame elements depending upon which of the plurality of side surfaces has heat concentrated thereon.

2. The battery casing assembly according to claim 1, wherein the at least one cover is spaced from one of the side surfaces of the battery housing by a distance.

3. The battery casing assembly according to claim 1, wherein each guide of the plurality of guides is injection-molded together with the battery housing.

4. The battery casing assembly according to claim 1, wherein the frame elements are made of sponge.

5. The battery casing assembly according to claim 1, wherein two guides of the plurality of guides are formed along two edges of at least one of the side surfaces of the battery housing so that the at least one cover of the plurality of covers can be fitted into the guides from a side of the battery housing.

6. The battery casing assembly according to claim 1, wherein at least two guides of the plurality of guides are formed on at least two adjoining side surfaces of the plurality of side surfaces of the battery housing.

7. The battery casing assembly according to claim 1, wherein the plurality of guides are formed along three edges each side surface of the plurality of side surfaces of the battery housing such that the at least one cover of the plurality of covers can be fitted into the guides from a top side of the battery housing.

* * * * *